US010888950B2

(12) United States Patent
Haddadi et al.

(10) Patent No.: US 10,888,950 B2
(45) Date of Patent: Jan. 12, 2021

(54) SYSTEMS AND METHODS FOR INTEGRATED WELDING OF METAL MATERIALS

(71) Applicant: Faraday&Future Inc., Gardena, CA (US)

(72) Inventors: Farid Haddadi, Wilmington, CA (US); Antonio Mercado-Perez, Murrieta, CA (US); Philip Antonio Reid Bethell, Newport Beach, CA (US)

(73) Assignee: FARADAY & FUTURE INC., Gardena, CA (US)

(*) Notice: Subject to any disclaimer, the term of this patent is extended or adjusted under 35 U.S.C. 154(b) by 204 days.

(21) Appl. No.: 16/026,829

(22) Filed: Jul. 3, 2018

(65) Prior Publication Data

US 2019/0105732 A1    Apr. 11, 2019

Related U.S. Application Data

(60) Provisional application No. 62/606,127, filed on Oct. 9, 2017.

(51) Int. Cl.
*B23K 11/12* (2006.01)
*B23K 11/11* (2006.01)
*B23K 11/24* (2006.01)
*B23K 11/30* (2006.01)

(52) U.S. Cl.
CPC .............. *B23K 11/12* (2013.01); *B23K 11/11* (2013.01); *B23K 11/24* (2013.01); *B23K 11/241* (2013.01); *B23K 11/3018* (2013.01)

(58) Field of Classification Search
CPC ... B23K 11/12; B23K 11/241; B23K 11/3018; B23K 11/11; B23K 11/115; B23K 11/24; B23K 20/10
See application file for complete search history.

(56) References Cited

U.S. PATENT DOCUMENTS 3,060,306 A * 10/1962 Inoue ................... B23K 11/251
219/110
3,789,183 A * 1/1974 Conley .............. B23K 11/0026
219/92

FOREIGN PATENT DOCUMENTS

DE          4323148 A1 *  1/1995  .......... B23K 11/315
JP          06114565 A  *  4/1994

* cited by examiner

*Primary Examiner* — Geoffrey S Evans

(57) ABSTRACT

A method for welding multiple workpieces together includes applying a force to the multiple workpieces, generating ultrasonic vibration, transferring the ultrasonic vibration to the multiple workpieces to breakdown an oxide layer, generating an electric current, transmitting the electric current to heat up the workpieces, and synchronizing the ultrasonic and resistance heating operations. A welding system includes an ultrasonic vibration unit that generates an ultrasonic vibration and transfers the ultrasonic vibration to multiple workpieces to breakdown an oxide layer, a resistance heating unit that generates an electric current and transmits the electric current to heat up the workpieces, a workpiece mount that includes electrodes configured to receive the generated current and/or clamp the multiple workpieces during a welding process, and a controller configured to synchronize an operation of the ultrasonic vibration unit and an operation of a resistance heating unit.

7 Claims, 6 Drawing Sheets

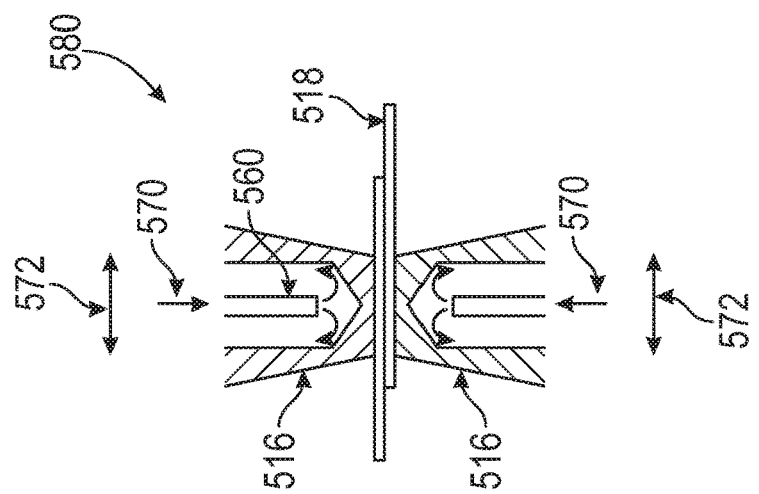
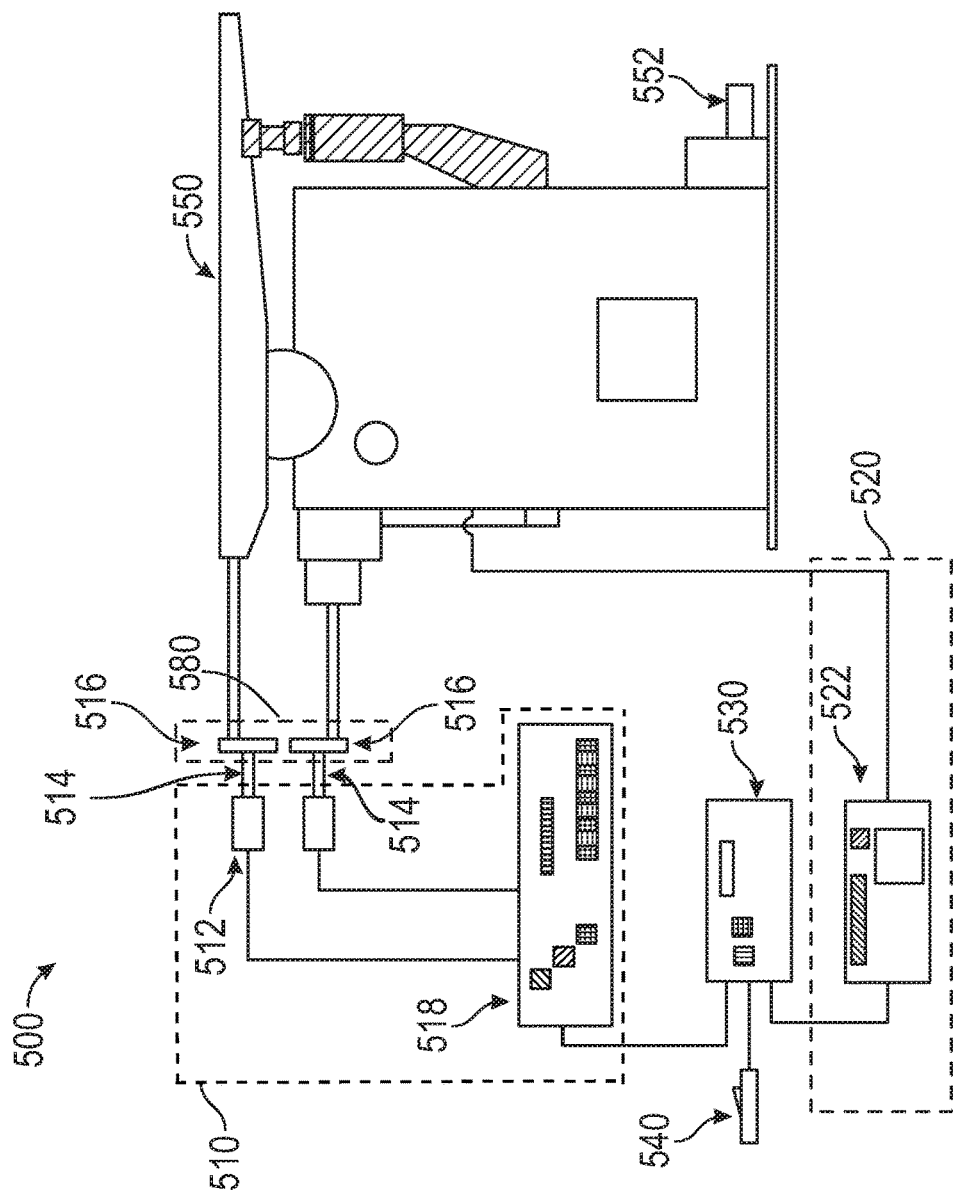

SYSTEMS AND METHODS FOR INTEGRATED WELDING OF METAL MATERIALS

CROSS-REFERENCE TO RELATED APPLICATIONS

This application claims priority to U.S. Provisional Patent Application No. 62/606,127, filed on Oct. 9, 2017 and titled "Welding Apparatus and Method," which is hereby incorporated by reference in its entirety.

FIELD OF THE DISCLOSURE

This disclosure relates generally to welding, and more particularly, to an integrated welding method and associated apparatuses.

BACKGROUND OF THE DISCLOSURE

There are multiple ways for welding two materials together. Two ways are resistance spot welding (RSW) and ultrasonic spot welding (USW), both having challenges and associated compromises for welding similar and dissimilar materials and large-sized workpieces.

RSW is a technique for joining thin gauge sheets used in various manufacturing applications including automotive, aerospace, and packaging. The RSW process begins by clamping workpieces between water-cooled copper electrodes. Axial forces are loaded and an electric current is applied to the workpieces through the electrodes. This will result in the breakdown of any oxide film present at the interface between the workpieces. The breakdown of the oxide film can create direct metal-to-metal contact of the workpieces at the interface. The application of axial forces may be particularly useful for lightweight materials, such as aluminum and magnesium, which may have greater sensitivity to form porosity and shrinkage voids. The electrical resistance of the materials causes heat at the interface of the workpieces and melting clusters form. These melting clusters can initially be limited in size and density, allowing a greater amount of energy to be expanded across the entire weld interface. The RSW process occurs in a liquid state where a melt pool will form at these melting clusters. The electric current will be removed, allowing the workpieces to cool and the melting clusters to solidify.

A challenge with RSW can be associated with the presence of an oxide film at the interface. An oxide film at the interface may prevent exposure of bare metal surfaces (of the workpieces) and may prevent the formation of a weld at the interface. The oxide film needs to be broken down, and the amount of power and temperature needed during the welding process may be based on this breakdown. Metals with a high electricity conductivity coefficient may require higher power and temperatures. For example, aluminum alloys or magnesium may require welding at higher power and temperatures compared to steel alloys. Another challenge with RSW can be the likelihood of cracking in the workpieces due to thermal shocks and solidification shrinkages.

USW is a technique for joining dissimilar materials used in the electronics industry. The USW process begins by holding the workpieces together using an anvil or fixture. A pressure is applied to keep contact between the workpieces at an interface. A vibration is applied to the workpieces using a sonotrode tip, where the vibration creates friction between the workpieces. This friction may breakdown any oxide film located at the interface. The friction and any applied temperature to the workpieces can heat up the surfaces of the materials at the interface, allowing metal atoms (from the workpieces) to move and form bonds (i.e., microwelds). The microwelds can hold the workpieces together. The amplitude, frequency, and direction of the vibration can be adjusted to increase the density and size of the microwelds.

A challenge with USW can be associated with the formation of microwelds for certain material combinations. Specifically, for material combinations such as aluminum-copper (Al—Cu), aluminum-silver (Al—Au), and aluminum-iron (Al—Fe), the vibration may create little-to-no reaction between the metal atoms of the workpieces or the formation of bonds at the interface, thereby making the formation of microwelds difficult. Additionally, during the welding process, the workpieces may be held together in a certain orientation such that at least some portions of the workpieces overlap the anvil or fixture. This overlap can obstruct accessibility, which may be particularly problematic when welding large panels. Another challenge with USW can be the higher probability of corrosion and degraded surface quality due to the applied vibration, particularly when high frequency oscillation is used.

SUMMARY OF THE DISCLOSURE

The embodiments of the present invention include an integrated welding system and method for operation thereof. The integrated welding system can efficiently bonding similar and dissimilar metal materials and associated apparatuses.

The integrated welding system can include an ultrasonic vibration unit, a resistance heating unit, and a controller. The ultrasonic vibration unit 510 is configured to create and apply an ultrasonic vibration to the workpieces, where the vibration may facilitate the breakdown of any oxide film located between the interfaces of the workpieces. The resistance heating unit 520 is configured to heat up the workpieces by way of an applied electric current. The controller 530 may control the ultrasonic vibration unit 510 and the resistance heating unit 520 for operation of the integrated welding system.

The disclosed integrated welding method can employ both ultrasonic vibration (e.g., friction) heating and electrical resistance heating. The ultrasonic vibration can breakdown the oxide film at the interface, exposing bare metal surfaces of the workpieces. Once bare metal surfaces are exposed, an electrical current can be applied to the workpieces. The electrical current generates heat due to the resistances of the workpieces. The heat can cause melting clusters to form. In some embodiments, ultrasonic vibration can be concurrently applied to uniformly distribute the melting metal. Once the workpieces are bonded, the electrical current can stop, and the ultrasonic vibration may continue as the melting clusters solidify to refine the dendritic structure, which is a tree-like structure of crystals growing as molten metal solidifies. The tree-like structure is produced due to faster crystal growth along energetically favorable crystallographic directions. Further, solidification stopped, application of further vibration results in creating deformation structure within the weld nugget, which is an area of a joint where two pieces of metals are welded together. The area of the weld nugget includes solidified metals having different structure compared to the respective parent materials.

The integrated welding method according to the present invention addresses the aforementioned shortcomings of conventional welding techniques, such as RSW and USW. In particular, the disclosed integrated welding method can breakdown the oxide films using lower power and temperatures, compared to RSW, for example. Additionally, the integrated welding method can create vacancies, at atomic scale, in the materials of the workpieces, which can accelerate melting process due to collapse of melting point and further lower the required power for the welding process.

The integrated welding method of the present invention can additionally improve microstructural and mechanical properties (e.g., bond strength, texture, grain structure, etc.) of the welded material. In some embodiments, the integrated welding method applies ultrasonic vibration while melting clusters solidify. The application of ultrasonic vibration may reduce the porosity of the welded material.

Vibration may also refine the dendritic structure and therefore, result in finer grain structure. Further vibration causes dynamic/static recrystallization and creates deformation structure within the weld nugget, resulting in a stronger weld nugget. Creating deformation structure within the welds changes crystallographic texture of the metallic grain which might deviates from the as solidified structure. Additionally, the number and size of cracks in the welded material may be reduced. The ultrasonic vibration may help the molten pool penetrate through cracks, voids, and/or openings, thereby filling them with welded material.

In one embodiment, a method for welding multiple workpieces together includes applying a force to the multiple workpieces; generating ultrasonic vibration using an ultrasonic vibration unit and transferring the ultrasonic vibration to the multiple workpieces to breakdown an oxide layer located at an interface between the multiple workpieces; generating an electric current using a resistance heating unit and transmitting the electric current to the multiple workpieces to heat up the workpieces to a given temperature; and synchronizing the operations of the ultrasonic vibration unit and the resistance heating unit.

In some embodiments, the multiple workpieces include dissimilar materials.

In some embodiments, generating the electric current occurs after a beginning of the generation of the ultrasonic vibration.

In some embodiments, the method further includes ceasing the generation of the ultrasonic vibration when the electric current is generated.

In some embodiments, the electric current is generated 50-500 milliseconds after the ultrasonic vibration generation is ceased.

In some embodiments, the method further includes ceasing the generation of the electric current and generating another ultrasonic vibration after the generated electric current has ceased.

In some embodiments, the method further includes ceasing the generation of the electric current; maintaining the ultrasonic vibration after the oxide layer is broken down; and allowing the multiple workpieces to cool while the ultrasonic vibration is maintained.

In some embodiments, the generated ultrasonic vibration is associated with an ultrasonic vibration signal waveform, and the generated electric current is associated with an electric current signal waveform; and the ultrasonic signal waveform and the electric current signal waveform are out of phase.

In some embodiments, the force and the ultrasonic vibration are applied and generated, respectively, in different directions.

In some embodiments, the generated ultrasonic vibration includes generating a vibration having a vibration pattern of at least one of cyclic movement, symmetric movement pattern, non-symmetric movement pattern, axial tapping, and periodic cyclic movement.

In some embodiments, the generated ultrasonic vibration has a frequency of 20.5 kilohertz and an amplitude between 5-10 micrometers, and the applied force is between 5-20 kN.

In some embodiments, the given temperature is less than a melting point of at least one of the multiple workpieces.

In some embodiments, the given temperature allows at least a portion of the workpieces to form a molten pool, the method further includes allowing the molten pool to penetrate through at least one of cracks, voids, and openings of the workpieces.

In one embodiment, a welding system includes an ultrasonic vibration unit including a transducer and a first power supply, the ultrasonic vibration unit configured to generate an ultrasonic vibration, and transfer the ultrasonic vibration to multiple workpieces to breakdown an oxide layer located at an interface between the multiple workpieces; a resistance heating unit including a second power supply, the resistance heating unit configured to generate an electric current, and transmit the electric current to the multiple workpieces to heat up the workpieces to a given temperature; a workpiece mount, the workpiece mount including electrodes, the electrodes configured to one or more of: receive the generated current and clamp the multiple workpieces during a welding process; and a controller configured to synchronize an operation of the ultrasonic vibration unit and an operation of a resistance heating unit.

In some embodiments, the multiple workpieces include dissimilar materials.

In some embodiments, the multiple workpieces include at least one of aluminum, magnesium, and galvanized steel.

In some embodiments, the first power supply is configured to generate power input to the ultrasonic vibration unit, the generated power associated with the generated ultrasonic vibration, and the transducer is configured to transform the generated power to mechanical energy; the system further includes a coupler configured to transform the mechanical energy to the ultrasonic vibration.

In some embodiments, the resistance heating unit further includes a power transformer configured to transform power from the second power supply to a charging circuit voltage; a charging circuit configured to receive the charging circuit voltage and transfer the charging circuit voltage to a capacitor bank, the capacitor bank configured to store the charging circuit voltage; a pulse switch configured to generate one or more current pulses from the stored charging circuit voltage; a contactor configured to selectively electrically couple the capacitor bank to either the charging circuit or the pulse switch; and a movable arm configured to deliver the one or more current pulses to at least one of the electrodes.

In some embodiments, the system further includes a plurality of rocker arms configured to apply a force on the multiple workpieces.

In some embodiments, at least one of the electrodes includes a coolant channel, the system further includes a water supply configured to circulate water through the coolant channel.

BRIEF DESCRIPTION OF THE DRAWINGS

The figures are not necessarily to scale, and emphasis is generally placed upon illustrative principles. The figures are to be considered illustrative in all aspects and are not intended to limit the disclosure, the scope of which is defined by the claims.

FIG. 2A is a schematic of an exemplary integrated welding system according to examples of the disclosure.

FIG. 2B is a detailed view of a workpiece mount used in an integrated welding system according to examples of the disclosure.

DETAILED DESCRIPTION

Figure 1:
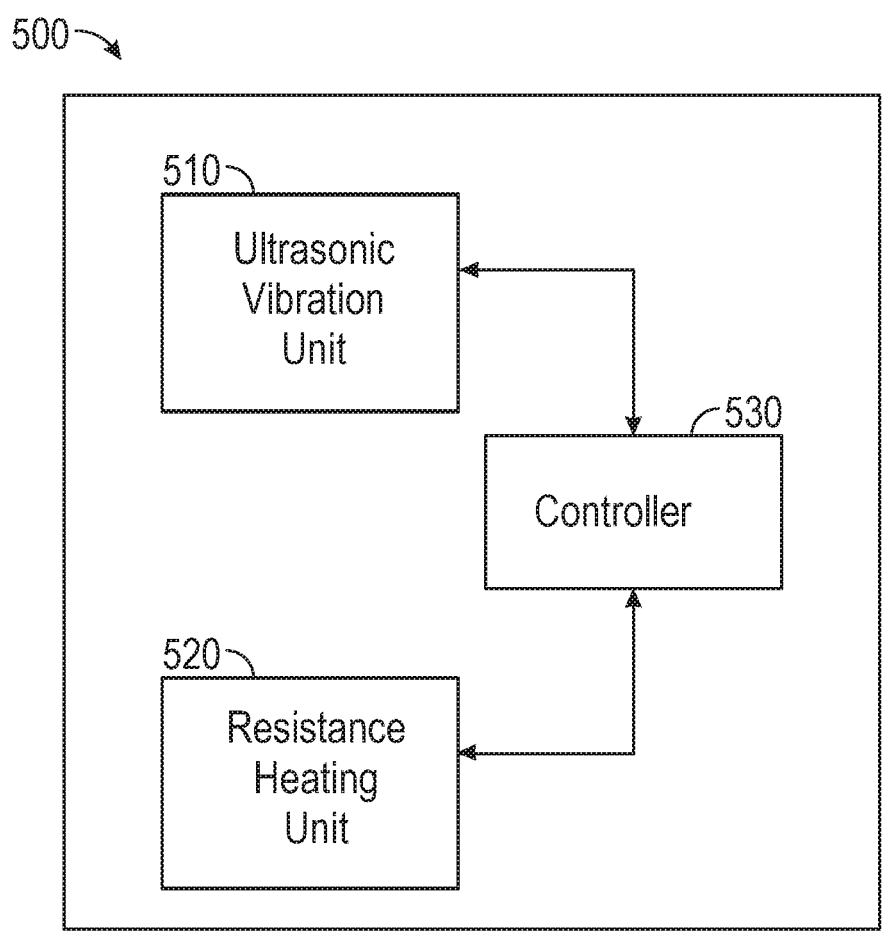
FIG. 1 is block diagram of an exemplary integrated welding system according to examples of the disclosure.

The embodiments of the present invention include an integrated welding system and method for operation thereof. The integrated welding system can efficiently bonding similar and dissimilar metal materials and associated apparatuses.

The integrated welding system can include an ultrasonic vibration unit, a resistance heating unit, and a controller. The ultrasonic vibration unit 510 is configured to create and apply an ultrasonic vibration to the workpieces, where the vibration may facilitate the breakdown of any oxide film located between the interfaces of the workpieces. The resistance heating unit 520 is configured to heat up the workpieces by way of an applied electric current. The controller 530 may control the ultrasonic vibration unit 510 and the resistance heating unit 520 for operation of the integrated welding system.

The disclosed integrated welding method can employ both ultrasonic vibration (e.g., friction) heating and electrical resistance heating. The ultrasonic vibration can breakdown the oxide film at the interface, exposing bare metal surfaces of the workpieces. Once bare metal surfaces are exposed, an electrical current can be applied to the workpieces. The electrical current generates heat due to the resistances of the workpieces. The heat can cause melting clusters to form. In some embodiments, ultrasonic vibration can be concurrently applied to uniformly distribute the melting metal. Once the workpieces are bonded, the electrical current can stop, and the ultrasonic vibration may continue as the melting clusters solidify.

The integrated welding method according to the present invention addresses the aforementioned shortcomings of conventional welding techniques, such as RSW and USW. In particular, the disclosed integrated welding method can breakdown the oxide films using lower power and temperatures, compared to RSW, for example. Additionally, the integrated welding method can create vacancies, at atomic scale, in the materials of the workpieces, which can accelerate melting process due to collapse of melting point and further lower the required power for the welding process.

The integrated welding method of the present invention can additionally improve microstructural and mechanical properties (e.g., bond strength, texture, grain structure, etc.) of the welded material. In some embodiments, the integrated welding method applies ultrasonic vibration while melting clusters solidify. The application of ultrasonic vibration may reduce the porosity of the welded material.

Vibration may also refine the dendritic structure and therefore, result in finer grain structure. Further vibration causes dynamic/static recrystallization and creates deformation structure within the weld nugget, resulting in a stronger weld nugget. Creating deformation structure within the welds changes crystallographic texture of the metallic grain which might deviates from the as solidified structure. Additionally, the number and size of cracks in the welded material may be reduced. The ultrasonic vibration may help the molten pool penetrate through cracks, voids, and/or openings, thereby filling them with welded material.

Overview of the Integrated Welding System

FIG. 1 is block diagram of an exemplary integrated welding system according to examples of the disclosure. The system 500 includes an ultrasonic vibration unit 510, a resistance heating unit 520, and a controller 530.

As discussed in more detail below, the ultrasonic vibration unit 510 is configured to create and apply an ultrasonic vibration to the workpieces, where the vibration may facilitate the breakdown of any oxide film located between the interfaces of the workpieces. The resistance heating unit 520 is configured to heat up the workpieces by way of an applied electric current.

The controller 530 may control the ultrasonic vibration unit 510 and the resistance heating unit 520 for operation of the integrated welding system. In some embodiments, the ultrasonic vibration unit 510 and the resistance heating unit 520 may operate concurrently. For example, the operation of the ultrasonic vibration unit 510 and the operation of the resistance heating unit 520 may be synchronized such that one unit performs one or more functions (e.g., breaking down an oxide film) and another unit performs other function(s) (e.g., melting the materials).

The components of the integrated welding system will now be described. FIG. 2A is a schematic of an exemplary integrated welding system according to examples of the disclosure. The integrated welding system 500 includes an ultrasonic vibration unit 510, a resistance heating unit 520, a controller 530, and a trigger 540. The dashed boxes shown as the ultrasonic vibration unit 510 and the resistance heating unit 520 are merely exemplary and not limiting. It is understood that the ultrasonic vibration unit 510 and resistance heating unit 520 can include unique or shared components that are not bounded by the boxes without departing from the scope of the disclosure.

The ultrasonic vibration unit 510 includes one or more transducers 512, one or more wedges 514, a workpiece mount 580, and a power supply 518. The ultrasonic vibration unit 510 is configured to create and apply an ultrasonic vibration to the workpieces (e.g., workpieces 518 located between electrodes 516 of the workpiece mount 580 illustrated in FIG. 2B). The ultrasonic vibration unit 510 and workpiece mount 580 are discussed in detail below.

The resistance heating unit 520 includes a power supply 522. The resistance heating unit 520 is configured to heat up the workpieces by way of an applied electric current. Although the figure illustrates the power supply 522 as being the only component included in the resistance heating unit 520, examples of the disclosure can include other components such as a firing switch, a charging circuit, a power transformer, a capacitor bank, a contactor, one or more pulse switches, a pulse transformer, a movable arm, electrodes, and the like (discussed below).

The controller 530 can control and/or synchronize the operation modes of the ultrasonic vibration unit 510 and the resistance heating unit 520. In some embodiments, the controller 530 controls the timing of the units. For example, the controller 530 can periodically activate one unit while deactivating the other. Alternatively, the controller can activate both units concurrently. In some embodiments, the controller 530 can selectively activate one or both units, depending on the application or the workpiece. The controller 530 can execute one or more stored software programs or can receive input manually from a user to provide one or more parameters for the welding process. Exemplary parameters can include, but are not limited to, vibration frequency, vibration amplitude, current frequency, current amplitude, etc.

The trigger 540 can be coupled to the controller 530 and is configured to facilitate with the control and/or synchronization of the ultrasonic vibration unit 510 and the resistance heating unit 520. In some embodiments, the trigger 540 is remotely controlled. The trigger 540 can be a switch configured to activate the controller 530. In some instances, the trigger 540 can dynamically (i.e., in real-time) instruct the controller 530 to update the welding parameters. For example, when the material of the workpiece changes, the trigger 540 instructs the controller 530 to update the welding parameters based on the updated workpiece. In another example, when a workpiece finishes welding, the trigger 540 instructs the controller 530 to synchronize operation modes of the integrated welding system for a new workpiece. In some embodiments, the functions of the controller 530 and the trigger 540 can be combined into a single component, such as a computer.

The integrated welding system 500 can additionally include rocker arms 550 and a water supply 552. The rocker arms 550 can apply axial forces (e.g., pressure) to the workpiece during the welding process. In some embodiments, the rocker arms 550 are configured to move the electrodes 516 to accommodate the geometries of the workpiece (not shown). The rocker arms 550 may be automated and controlled using a processor (or controller 530). For example, the integrated welding system 500 can be part of an assembly line, where the workpieces can be assembled and transported using the rocker arms 550. In some embodiments, the rocker arms 550 can be coupled to the resistance heating unit 520. In this manner, the electric current applied by the resistance heating unit 520 or heat generated by the electric current may be transmitted to the electrodes 516 through the rocker arms 550.

The water supply 552 circulates water (or another liquid such as coolant) through the integrated welding system 500 for temperature control (e.g., cooling). In some embodiments, the water supply 552 circulates chilled water through a coolant channel of the electrodes 516.

FIG. 2B is detailed view of the workpiece mount 580 according to examples of the disclosure. The workpiece mount 580 can include electrodes 516 and an anvil or fixture (not shown). The electrodes 516 may be configured to make physical and/or electrical contact with the workpieces 518. The anvil or fixture may optionally be a component separate from the electrodes 516. In some embodiments, the electrodes 516 are copper and can be configured to transfer an applied electrical current (from the power supply 522 included in the resistance heating unit 520, as illustrated in FIG. 2A) to the workpieces 518. In some embodiments, the electrodes 516 are machined to be patterned sonotrode tips.

The sonotrode tips can contact and vibrate the workpieces 518 during the welding process.

The workpieces 518 can include any material suitable for welding. For example, the workpieces 518 can include aluminum or magnesium. The workpieces 518 may include a similar material or different materials.

The workpieces 518 may experience lateral or longitudinal movement or pressure during the welding process. The rocker arms 550 can apply a force 570 (e.g., axial force) to the electrodes 516. Additionally or alternatively, an anvil (not shown) used to clamp the workpieces 518 can apply the force 570. The electrodes 516 can transfer the applied force to the workpieces 518. The force 570 can prevent or reduce movement of the workpieces 518 during the welding process. In some examples, the force 570 can be used to reduce the porosity of the welded workpiece. Additionally or alternatively, during at least one of the operation modes of the welding process, the ultrasonic vibration unit 510 can apply ultrasonic vibration to the electrodes 516, causing the workpieces 518 to vibrate in the direction 572.

The electrodes 516 can include one or more coolant channels 560. The coolant channels 560 are configured to cool and/or stabilize the temperature of the electrodes 516. The cooling may help compensate for any temperature increases due to the welding process. In some embodiments, the coolant channels 560 can be used to cool the electrodes 516 after active heating by the resistance heating unit 520 stops.

Although specific components are described for the disclosed ultrasonic vibration unit, the resistance heating unit, and the integrated welding system, it is understood that different components, additional components, or different numbers of components can achieve integrated welding without departing from the scope of the disclosure.

Ultrasonic Vibration Unit

In welding multiple workpieces together, an oxide film may form at an interface between the workpieces. This oxide film may cover the bare metal surfaces of the workpieces, preventing the workpieces from bonding together or reducing the integrity of the bond(s). Thus, the oxide film needs to be broken down in order to weld the workpieces together. One way to breakdown the oxide film can be to heat up the workpieces. For example, an electric current can be applied to create the heat via electrical resistance. For certain materials, specifically ones having a higher melting point such as aluminum or magnesium, a large amount of energy (e.g., applied electrical current) may be needed.

Another way to breakdown the oxide film can be to apply a vibration, which can cause friction between the workpieces. The friction can mechanically remove the oxide film. In some instances, the vibration can be an ultrasonic vibration involving high frequency oscillation (e.g., 10-20.5 kHz). One advantage to using ultrasonic vibration to remove the oxide film can be enhanced mechanical properties of the welded workpieces, as the ultrasonic vibration can be uniformly induced throughout the workpieces (instead of at select concentrated locations, for example).

Figure 3:
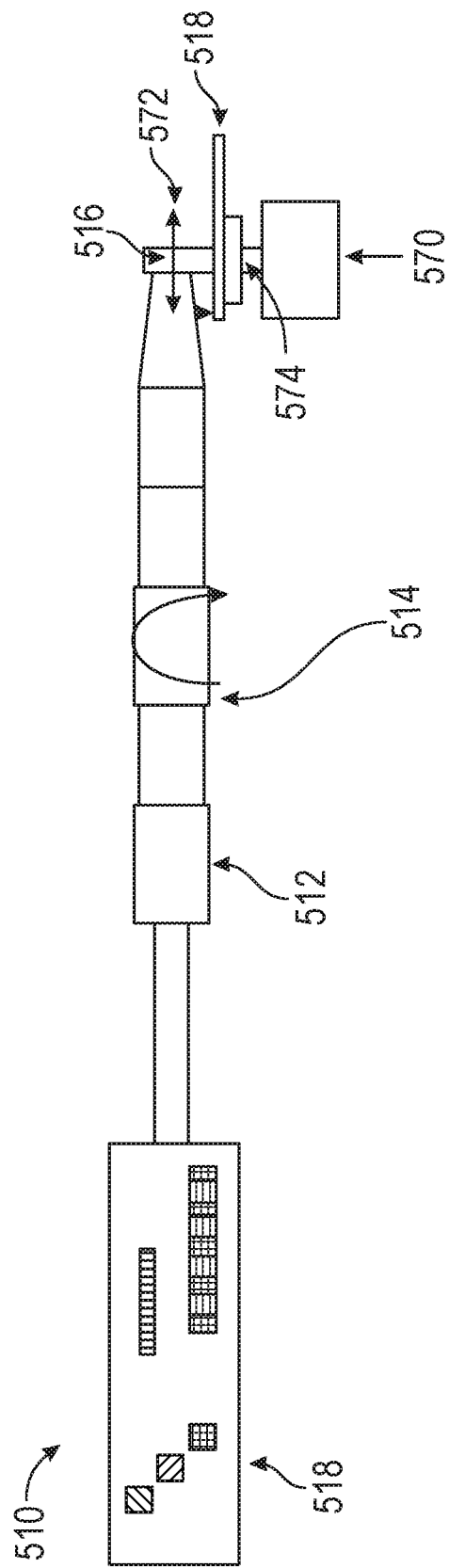
FIG. 3 is a schematic of an exemplary ultrasonic vibration unit included in an integrated welding system according to examples of the disclosure.

FIG. 3 is a schematic of an exemplary ultrasonic vibration unit included in an integrated welding system according to examples of the disclosure. The ultrasonic vibration unit 510 includes an electrode 516, a power supply 518, a wedge 514, a transducer 512, and an anvil 574. Although the figure illustrates a single electrode 516 and a single wedge 514, examples of the disclosure can include an ultrasonic vibration unit including multiple electrodes and multiples of other components.

As discussed earlier, the electrode 516 can be machined to be one or more patterned sonotrode tips that apply ultrasonic vibration 572 to the electrode 516. The workpiece 518 and anvil 574 can similar experience the vibration 572 due to contact between the electrode 516, the workpiece 518, and the anvil 574. The propagation of the vibration 572 can depend on the power delivered by the transducer. For instance, for automotive applications, when an axial force of 5-20 kN is applied, and the vibration 572 can propagate to within a range of 5-10 μm from the interface between the workpieces (e.g., the vibration has an amplitude between 5-10 μm). The properties (e.g., frequency, amplitude, etc.) of the vibration 572 may depend on the application and/or properties of the workpieces.

The power supply 518 can output one or more voltages to generate a high frequency ultrasonic vibration (e.g., 10-20.5 kHz). In some embodiments, one or more components included in the ultrasonic vibration unit 510 can be included in other units (e.g., resistance heating unit 520) of the integrated welding system 500.

The wedge 514 can be coupled to the transducer 512 and can include one or more boosters to amplify the mechanical energy output from the transducer 512. In some embodiments, the wedge 514 can include one or more couplers to transfer mechanical energy from the booster(s) to the electrodes 516. The wedge 514 can receive mechanical energy having from a first form (e.g., rotational) and can convert it to a second form (e.g., vibrational), for example. Additionally or alternatively, the wedge 514 is a mechanical arm that provides at least a portion of the axial force 570.

Figure 4:
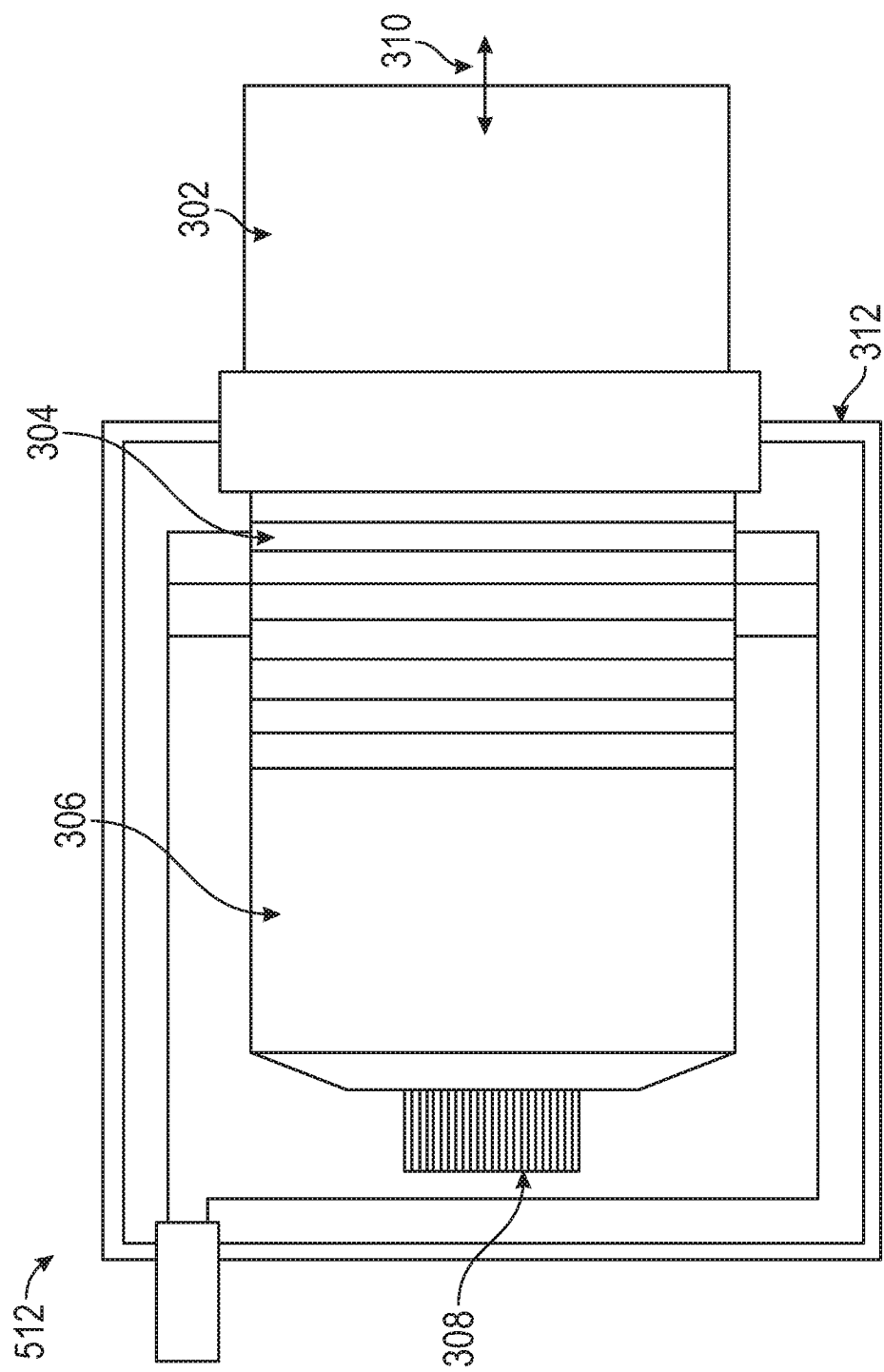
FIG. 4 is a schematic of an exemplary transducer included in an ultrasonic vibration unit according to examples of the disclosure.

FIG. 4 illustrates exemplary components of transducer 512 according to an embodiment of the disclosure. The transducer 512 includes piezoelectric disks 304, a front driver 302, a rear driver 306, and a compression bolt 308. At least a portion of the transducer 512 is enclosed in an enclosure case 312. The transducer 512 receives electric power from a power supply 518 and outputs mechanical vibration. In some embodiments, the transducer 512 receives 10-10000 watts from the power supply 518.

The piezoelectric disks 304 can be configured to transform the electric power (e.g., from a power supply 518 illustrated in FIG. 3) to mechanical vibration. In response to a varying voltage, each piezoelectric disk 304 can expand or compress, creating a mechanical vibration. In some embodiments, the number of piezoelectric disks 304 can be configured until a desired vibration characteristic (e.g., amplitude, frequency, etc.) is reached. For example, the number of piezoelectric disks 304 included in the transducer 512 can be based on a targeted vibration amplitude of the integrated welding system. In some embodiments, the piezoelectric disks 304 are made from Quartz or Berlinite (i.e. AlPO4).

The front driver 302 is mechanically coupled to the piezoelectric disks 304 and configured to transfer the vibration from the piezoelectric disks 304 to another component (e.g., wedge 514, electrodes 516, etc. illustrated in FIG. 3). The front driver 302 can include aluminum or titanium alloys.

The rear driver 306 is mechanically coupled to the compression bolt 308 and the piezoelectric disks 304. The rear driver 306 receives the electric power (e.g., electric current from a power supply 518) and may transfer the electric power to the piezoelectric disks 304. The compression bolt 308 is configured to concentrically align the rear driver 306, front driver 302, and the piezoelectric disks 304 along an axis. For example, the axis is parallel to the vibration direction. In some embodiments, the rear driver 306 includes steel, and the compression bolt 308 includes ceramic.

The transducer 512 can be configured to vibrate along vibration direction 310 at the configured frequency of the piezoelectric disks 304 (e.g., resonant frequency). The resonant frequency can be determined by characteristics (e.g., dimensions, material properties, etc.) of one or more components included in the transducer 512. In some embodiments, the transducer 512 is configured for more than one resonant frequency. In some embodiments, the amplitude and/or frequency of vibration may depend on the type of workpiece material (e.g., from aluminum to magnesium). In some embodiments, the amplitude of the vibration is approximately 10-40 μm peak-to-peak.

Examples of the disclosure can also include applying a vibration in any possible pattern. Vibration patterns can include, but are not limited to, cyclic movement of the electrodes 516 and/or anvil 574 having a given phase shift, a certain (e.g., symmetric or non-symmetric) movement pattern, in- or out-of-plane linear, oval, or circular cyclic movements, and axial tapping of the electrodes 516 and/or anvil 574. The vibration patterns may also include cyclic movement of the electrodes 516 and/or anvil 574 at any frequency or wavelength. Although vibration patterns can be described with the above movements, it is understood that vibration patterns are not limited to only the above movements, and the vibration patterns can include other movements, without departing from the scope of the disclosure.

Resistance Heating Unit

In order to weld the workpieces together, heat is required to melt at a least a portion of the workpieces at the interface. The resistance heating unit can generate heat. As discussed below, portions of the workpieces can be melted after the ultrasonic vibration unit 510 removes the oxide film at the interface and exposes bare metal surfaces of the workpieces.

The resistance heating unit 520 is configured to heat up the workpieces by way of an applied electric current to the workpieces. An AC or DC electric current can pass through the electrodes. The magnitude and duration of the applied electric current may depend on the electrical resistances of the workpieces. For example, an electric current of approximately 30-40 kA may be applied over an interval of approximately 50-100 milliseconds to weld aluminum or magnesium.

Figure 5:
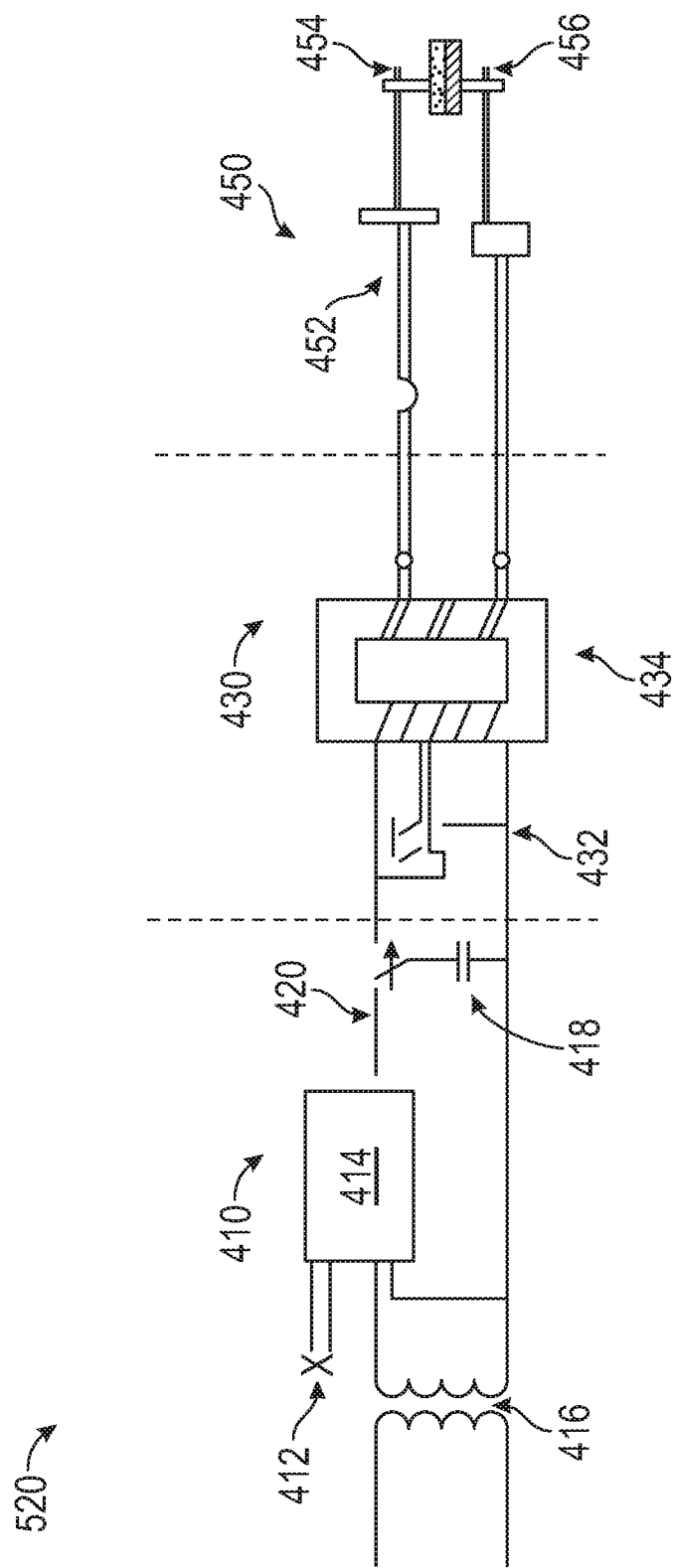
FIG. 5 is a schematic of an exemplary resistance heating unit according to examples of the disclosure.

FIG. 5 is a schematic of an exemplary resistance heating unit according to examples of the disclosure. The resistance heating unit 520 includes a control current unit 410, a pulse transformer unit 430, and a delivery unit 450. The resistance heating unit 520 can also include the power supply 522 illustrated in FIG. 2A. The power supply 522 can provide an input voltage or current to the control current unit 410.

The control current unit 410 includes a power transformer 416, a firing switch 412, a charging circuit 414, a contactor 420, and a capacitor bank 418. The power transformer 416 can transform an input voltage (e.g., from the power supply 522) to a charging circuit voltage. The charging circuit voltage may be a very high voltage required to generate large currents necessary for resistance heat generation. In some embodiments, the power transformer 416 includes one or more pairs of inductors configured to increase the input voltage to result in the charging circuit voltage. The firing switch 412 can optionally be used to activate the charging circuit 414, allowing the charging circuit 414 to receive the charging circuit voltage as input.

The contactor 420 may include one or more switches (e.g., transistors) controlled by an external controller (not shown). The contactor 420 can electrically couple the charging circuit 414 to the capacitor bank 418, which may then store the charging circuit voltage. The capacitor bank 418 may include one or more capacitors having one or more capacitance values suitable for generating the electric current for resistance heating.

The pulse transformer unit 430 includes a primary pulse switch 432 and a pulse transformer 434. When the capacitor bank 418 stores a certain amount of charge, the contactor 420 electrically couples the capacitor bank 418 to the pulse transformer unit 430. In some examples, the contactor 420 will electrically couple the capacitor bank 418 to the pulse transformer unit 430 when the capacitor(s) in the capacitor bank 418 are fully charged. In this manner, sufficient charge may be stored at the capacitor bank 418 to provide the current needed for resistance heating.

The primary pulse switch 432 generates one or more pulses of current from the charge stored at the capacitor bank 418. The one or more pulses of current are input to the pulse transformer 434. The pulse transformer 434 may deliver the current from the pulse transformer unit 430 to the delivery unit 450. In some embodiments, the pulse transformer 434 converts the one or more pulses of current into a continuous current signal having one or more frequencies. The pulse transformer 434 can be a passive or active filter.

The delivery unit 450 includes a movable arm 452, an upper welding electrode 454, and a lower welding electrode 456. The current signals from the pulse transformer 434 are delivered to the movable arm 452. In some embodiments, the delivery unit 450 can include a second movable arm configured to return the current signals, thereby completing the circuit. The movable arms 452 may be conductive structural elements mechanically and electrically coupled to the upper and lower electrodes 454 and 456. In some embodiments, the movable arms 452 may be configured to apply an axial force on the workpieces (e.g., workpiece 518 illustrated in FIG. 2B). Additionally or alternatively, the movable arms 452 are configured to release the workpieces after the welding process finishes. In some embodiments, the upper and lower electrodes 454 and 456 are part of electrodes 516.

The amount of heat generated by resistance heating unit 520 can depend on one or more factors such as the resistances of the workpieces at the interface and the amount of axial force.

Operation of the Integrated Welding System

Figures 6A, 6B, 6C:
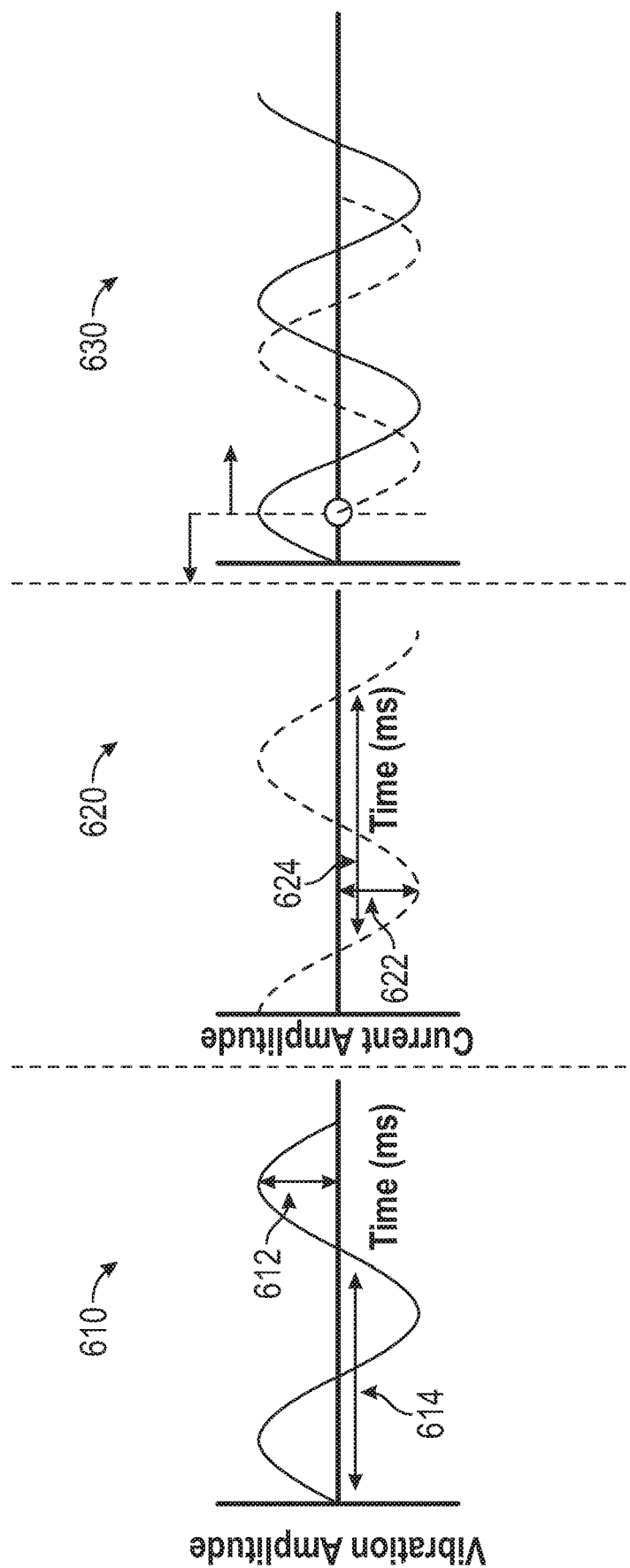
FIGS. 6A-6C illustrate timing diagrams of exemplary operations of an integrated welding system according to examples of the disclosure.

FIGS. 6A-6C illustrate timing diagrams of an exemplary operation of an integrated welding system according to examples of the disclosure. The operation of the integrated welding system can begin by applying an axial pressure to the workpieces.

An ultrasonic vibration is applied using an ultrasonic vibration unit (e.g., ultrasonic vibration unit 510 illustrated in FIG. 3) to breakdown any oxide film located at the interface, allowing bare metal surfaces of the workpieces to be exposed. In some examples, the ultrasonic vibration may be generated using short cycle vibrations, such as those having periods of 0.05 seconds, 10 milliseconds, etc. The energy required to breakdown the oxide film using the ultrasonic vibration may be lower than required in the conventional RSW method. For example, the ultrasonic vibration of the integrated welding method may require 150 joules.

The applied ultrasonic vibration may be represented by the ultrasonic vibration signal waveform 610 shown in FIG. 6A, which may be generated by the ultrasonic vibration unit. The ultrasonic vibration signal waveform 610 may have a vibrational amplitude 612 and a period 614.

An electric current is applied to the electrodes, which can create heat at the bare metal interfacing surfaces. In some examples, the electric current may be applied after the oxide film is removed (e.g., by ultrasonic vibration). In other examples, the electric current may be applied while the oxide film is removed, where the resistance heating unit can generate an electric current after the generation of the ultrasonic vibration begins. Because the oxide film may be removed at a prior step, the applied electric current used in the integrated welding method can be lower than the electric current used in the conventional RSW method.

In some examples, the resistance heating unit may be activated approximately 50-500 milliseconds after the beginning of when the ultrasonic heating unit is activated or when deactivated (i.e., the ultrasonic heating unit ceases generating ultrasonic vibration). The applied electric current may be represented by the current signal waveform 620 shown in FIG. 6B, which may be generated by the resistance heating unit (e.g., resistance heating unit 520 illustrated in FIG. 5). The current signal waveform 620 may have an amplitude 622 and period 624. The current signal waveform may include a plurality of pulses.

In some embodiments, the ultrasonic vibration unit and the resistance heating unit can be synchronized using a controller (e.g., controller 530 illustrated in FIG. 2A), for example, such that the ultrasonic vibration unit generates the vibration signal waveform 610 and the resistance heating unit generates the resistance signal waveform 620 at different times. For example, the ultrasonic vibration unit may be activated while an oxide film at the interface of the workpieces is being broken down. Simultaneously, the resistance heating unit may not be activated. Once the oxide film is removed, the ultrasonic vibration unit may be deactivated, and the resistance heating unit may be activated to heat the workpieces for forming melting clusters.

In some embodiments, the controller can control the ultrasonic vibration unit and the resistance heating unit such that the ultrasonic vibration signal waveform and the current signal waveform are generated concurrently, as shown in FIG. 6C. The waveform 630 can include both the ultrasonic vibration signal waveform and the current signal waveform, which may be generated out of phase.

Although the exemplary ultrasonic vibration signal waveform and the current signal waveform are illustrated as oscillating sinusoids having different phases, it is understood that the ultrasonic vibration signal waveform can have any amplitude, shape and/or timing characteristics, which may be independent from the properties of the current signal waveform. As another example, either or both signal waveforms may have more than one frequency component (e.g., the current signal waveform may include a DC current having zero frequency).

In some embodiments, the operation modes and its parameters (e.g., amplitude, timing, and sequence) of the units and components included in the welding system can depend on application and/or the workpieces. For example, the amplitude, timing, and/or phase difference can be determined by the properties (e.g., material, size, geometry) of the workpieces. In some examples, the operation modes and its properties can be determined dynamically (i.e., in real-time). Exemplary operating parameters include, but are not limited to, timing between the units, the application of axial force, the current amplitude, the current frequency, the ultrasonic vibration amplitude, the ultrasonic vibration frequency over time, etc.

In some examples, the ultrasonic vibrations can be applied prior to activating the resistance heating unit, thereby reducing the temperature needed to form a molten pool for welding. The use of ultrasonic vibration during the welding process can create vacancies at atomic scale in the workpieces at the interface. The vacancies decrease the melting point of the workpieces, which may lead to a lower required power (e.g., current) in order to form the molten pool.

In other examples, the ultrasonic vibrations can be applied concurrently with the electrical current. An advantage to having both units activated can include improved material quality (e.g., refined grain structure of the workpieces, enhanced weld uniformity, etc.).

In yet another example, the applied electric current can stop before or while an ultrasonic vibration is applied. For example, the resistance heating can bond the workpieces together, the resistance heating can stop, and the ultrasonic vibration can begin or may continue while the melting clusters solidify.

The integrated welding method of the present invention can additionally improve the mechanical properties (e.g., bond strength, texture, grain structure, etc.) of the welded material. In some embodiments, the integrated welding method applies ultrasonic vibration while melting clusters solidify to refine the dendritic structure. The application of ultrasonic vibration may reduce the porosity of the welded material. Additionally, the number and size of cracks in the welded material may be reduced. The ultrasonic vibration may help the molten pool penetrate through any cracks, thereby filling in the cracks and voids with welded material. When solidification completes within the weld nugget, further vibration may create deformation structure within the weld nugget due to dynamic/static recrystallization, resulting in ultrafine grain structure and thus, stronger mechanical properties.

The use of sections is not meant to limit the disclosure. Each section can apply to any aspect, embodiment, or feature of the disclosure.

Where devices are described as having, including, or comprising specific components, or where processes are described as having, including or comprising specific process steps, it is contemplated that devices of the disclosure also consist essentially of, or consist of, the recited components, and that the processes of the disclosure also consist essentially of, or consist of, the recited process steps.

The use of the terms "include," "includes," "including," "have," "has," or "having" should be generally understood as open-ended and non-limiting unless specifically stated otherwise. The use of the singular herein includes the plural (and vice versa) unless specifically stated otherwise. Moreover, the singular forms "a," "an," and "the" include plural forms unless the context clearly dictates otherwise.

The term "about" before a quantitative value includes the specific quantitative value itself, unless specifically stated otherwise. As used herein, the term "about" refers to a ±10% variation from the quantitative value.

It should be understood that the order of steps or order for performing certain actions is immaterial so long as the disclosure remains operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The invention claimed is:

1. A welding system comprising:
   a transducer for generating mechanical vibrations in response to one or more first voltages;
   a first power supply electrically coupled to the transducer and providing the one or more first voltages to the transducer;
      wherein the generated mechanical vibration is mechanically coupled from the transducer to multiple workpieces having:
         an oxide layer located at an interface between the multiple workpieces, and
         impedances associated with each of the multiple workpieces
   a heat generation circuit for generating electrical current in response to one or more second voltages, the heat generation circuit comprising a power transformer, a capacitor bank, and a pulse transformer;
   a second power supply electrically coupled to the heat generation circuit and providing the one or more second voltages to the heat generation circuit;
      wherein the generated electrical current is directed from the heat generation circuit to the multiple workpieces;
   a workpiece mount mechanically coupled to the transducer and electrically coupled to the heat generation circuit, the workpiece mount including electrodes mechanically coupling the generated mechanical vibration and electrically coupling the generated electrical current to the multiple workpieces; and
   a controller for controlling timing of the transducer and the heat generation circuit.

2. The system of claim 1, wherein the multiple workpieces include dissimilar materials.

3. The system of claim 1, wherein the multiple workpieces comprise at least one of aluminum, magnesium, and galvanized steel.

4. The system of claim 1, wherein:
   the transducer comprises piezoelectric disks for transforming the provided one or more first voltages into the mechanical vibrations, the one or more first voltages and the mechanical vibrations having related timing characteristics,
   the system further comprising a coupler for transferring mechanical energy from the transducer to at least one of the electrodes.

5. The system of claim 1, wherein:
   the power transformer comprises inductors for transforming voltage from the second power supply to a charging circuit voltage;
   the heat generation circuit further comprises a charging circuit for receiving the charging circuit voltage and transferring the charging circuit voltage to the capacitor bank for storing the charging circuit voltage; and
   the pulse transformer comprises:
      a pulse switch for generating one or more current pulses from the stored charging circuit voltage, and
      a contactor for selectively electrically coupling the capacitor bank to either the charging circuit or the pulse switch;

the system further comprising a movable arm for delivering the one or more current pulses to at least one of the electrodes.

6. The system of claim 1, further comprising a plurality of rocker arms for applying a force on the multiple workpieces.

7. The system of claim 1, wherein at least one of the electrodes includes a coolant channel, the system further comprising a water supply configured to circulate water through the coolant channel.

\* \* \* \* \*